United States Patent

Henderson et al.

[11] Patent Number: 6,101,216
[45] Date of Patent: Aug. 8, 2000

[54] SPLITTERLESS DIGITAL SUBSCRIBER LINE COMMUNICATION SYSTEM

[75] Inventors: P. Michael Henderson, Tustin, Calif.; Kenneth D. Ko, Clearwater, Fla.; Edward S. Zuranski, Largo, Fla.; Jamal Haque, Tampa, Fla.; Shrenik P. Patravali, St. Petersburg, Fla.; Manuel I. Rodriguez, St. Pete, Fla.; Keith A. Souders, Tampa, Fla.; Anthony A. Tzouris, Clearwater, Fla.

[73] Assignee: Rockwell International Corporation, Costa Mesa, Calif.

[21] Appl. No.: 08/943,484

[22] Filed: Oct. 3, 1997

[51] Int. Cl.⁷ .................................................. H04B 1/38
[52] U.S. Cl. ......................... 375/222; 379/93; 379/134; 379/140
[58] Field of Search .................. 375/222, 225, 375/275; 379/93, 134, 140

[56] References Cited

U.S. PATENT DOCUMENTS

| | | | |
|---|---|---|---|
| 4,333,175 | 6/1982 | Cook et al. | 370/56 |
| 4,689,783 | 8/1987 | Kaczerowski | 370/56 |
| 4,700,340 | 10/1987 | Beranek et al. | 370/16 |
| 4,761,779 | 8/1988 | Nara et al. | 370/58 |
| 4,766,594 | 8/1988 | Ogawa et al. | 371/22 |
| 4,799,217 | 1/1989 | Fang | 370/68.1 |
| 4,961,186 | 10/1990 | Chandramouli et al. | 370/79 |
| 5,144,625 | 9/1992 | Cain et al. | 370/110.1 |
| 5,243,593 | 9/1993 | Timbs | 370/58.1 |
| 5,297,145 | 2/1994 | Havermans | 370/100.1 |
| 5,367,540 | 11/1994 | Kakuishi et al. | 375/103 |
| 5,408,260 | 4/1995 | Arnon | 348/6 |
| 5,410,343 | 4/1995 | Coddington et al. | 348/7 |
| 5,442,693 | 8/1995 | Hays et al. | 379/308 |
| 5,461,616 | 10/1995 | Suzuki | 370/79 |
| 5,479,447 | 12/1995 | Chow et al. | 375/260 |
| 5,519,731 | 5/1996 | Cioffi | 375/260 |
| 5,528,281 | 6/1996 | Grady et al. | 348/7 |
| 5,534,912 | 7/1996 | Kostreski | 348/6 |
| 5,559,858 | 9/1996 | Beveridge | 379/56 |
| 5,592,540 | 1/1997 | Beveridge | 379/184 |
| 5,596,604 | 1/1997 | Cioffi et al. | 345/260 |
| 5,625,404 | 4/1997 | Grady et al. | 348/7 |
| 5,627,501 | 5/1997 | Biran et al. | 333/17.1 |
| 5,668,857 | 9/1997 | McHale | 379/93.07 |
| 5,805,669 | 9/1998 | Bingel et al. | 379/28 |
| 5,852,630 | 12/1998 | Langberg et al. | 375/219 |
| 5,883,941 | 3/1999 | Ankers | 379/93.08 |
| 5,889,856 | 3/1999 | O'Toole et al. | 379/399 |
| 5,909,445 | 1/1999 | Schneider | 370/468 |
| 5,910,970 | 6/1999 | Lu | 375/377 |
| 6,014,425 | 1/2000 | Bingel et al. | 379/27 |

FOREIGN PATENT DOCUMENTS

| | | |
|---|---|---|
| 0 820 168 A2 | 1/1998 | European Pat. Off. . |
| 97 20396 | 6/1997 | WIPO . |
| WO 98 27665 | 6/1998 | WIPO . |

*Primary Examiner*—Stephen Chin
*Assistant Examiner*—Dac V. Ha

[57] ABSTRACT

A digital subscriber line communication system does not require the use of a plain old telephone service (POTS) splitter in the resident's home. Digital signal processing techniques are utilized to adapt to varying subscriber line conditions due to POTS telephone equipment. The digital signal processing techniques eliminate the need for a splitter by reducing susceptibility to distortion due to varying subscriber line characteristics. The digital subscriber line modem utilizes quadrature amplitude modulated (QAM) signals and frequency division multiplexing. The digital subscriber line modem includes a control circuit which includes a rapid retrain circuit. The rapid retrain circuit can retrain the digital subscriber line modem in less than 0.5 seconds.

29 Claims, 5 Drawing Sheets

SPLITTERLESS DIGITAL SUBSCRIBER LINE COMMUNICATION SYSTEM

FIELD OF THE INVENTION

The present invention relates generally to communication systems. More particularly, the present invention relates to a digital subscriber line modem.

BACKGROUND OF THE INVENTION

Explosive growth of the internet and the worldwide web is driving a need for increased communication data rates. In the corporate world, the need for high-speed access or data rates is met by dedicated high-speed links (perhaps T1/E1 frame relays or OC1 ATM systems) from the company to an internet access provider. Users in the company utilize a local area network (LAN) to gain access to an internet access router which is attached to the high-speed link. Unfortunately, home users of the internet do not often have a high-speed link and must rely on standard analog or plain old telephone service (POTS) line.

The need for high-speed access to the home is ever increasing due to the availability of information, data, programs, entertainment, and other computer applications on the worldwide web and the internet. For example, designers of web technology are constantly developing new ways to provide sensory experiences, including audio and video, to users of the web (web surfers). Higher-speed modems will be required so the home user can fully interact with incoming web and communication technologies.

Although designers of modems are continuously attempting to increase data rates, analog or POTS line modems are presently only able to reach data rates of up to 56 kilobits per second (Kbps). These conventional analog modems transmit and receive information on PDTS subscriber lines through the public switched telephone network. The internet access provider is also coupled to the switched telephone network and transmits and receives information through it to the subscriber line.

Some home users have utilized ISDN equipment and subscriptions to obtain up to 128 Kbps access or data rates by the use of 2 B channels. ISDN equipment and subscriptions can be expensive and require a dedicated subscriber line. Heretofore, neither ISDN modems nor analog modems are capable of providing 256 Kbps or higher access between the home and the internet. Over one megabit per second (Mbps) data rates with analog modems or ISDN equipment do not seem feasible at this time.

A variety of communication technologies are competing to provide high-speed access to the home. For example, asymmetric digital subscriber lines (ADSL), cable modems, satellite broadcast, wireless LANs, and direct fiber connections to the home have all been suggested. Of these technologies, the asymmetric digital subscriber line can utilize the POTS subscriber line (the wire currently being utilized for POTS) between the home user (the residence) and the telephone company (the central office).

ADSL networks and protocols were developed in the early 1990's to allow telephone companies to provide video-on-demand service over the same wires which were being used to provide POTS. ADSL technologies include discrete multitone (DMT), carrierless amplitude and phase modulation (CAP), high-speed ADSL (HADSL), and other technologies. Although the video-on-demand market has been less than originally expected, telephone companies have recognized the potential application of ADSL technology for internet access and have begun limited offerings.

ADSL technology allows telephone companies to offer high-speed internet access and also allows telephone companies to remove internet traffic from the telephone switch network. Telephone companies cannot significantly profit from internet traffic in the telephone switch network due to regulatory considerations. In contrast, the telephone company can charge a separate access fee for ADSL services. The separate fee is not as restricted by regulatory considerations.

With reference to FIG. 1, a conventional asymmetric ADSL (ADSL) system 10 includes a copper twisted pair analog subscriber line 12, an ADSL modem 14, an ADSL modem 16, a band splitter 18, and a band splitter 20. Line 12 is a POTS local loop or wire connecting a central office 32 of the telephone company and a user's residence 22.

ADSL modem 14 is located in user's residence 22 and provides data to and from subscriber line 12. The data can be provided from line 12 through modem 14 to various equipment (not shown) coupled to modem 14. Equipment, such as, computers, network devices, servers, or other devices, can be attached to modem 14. Modem 14 communicates with a data network (not shown) coupled to modem 16 across line 12. ADSL modem 16 receives and transmits signals to and from line 12 to the data network. The data network can be coupled to other networks (not shown), including the internet.

At least one analog telephone 26, located in residence 22, can be coupled to subscriber line 12 through splitter 20 for communications across line 12 with telephone switch network 28. Telephone 26 and telephone switch network 28 (e.g., public-switched telephone (PST) network) are conventional systems well-known in the art. Alternatively, other analog equipment, such as, facsimile machines, POTS modems, answering machines, and other telephonic equipment, can be coupled to line 12 through splitter 20.

System 10 requires that band splitter 18 and band splitter 20 be utilized to separate higher frequency ADSL signals and lower frequency POTS signals. For example, when the user makes a call from residence 22 on telephone 26, lower frequency signals (under 4 kilohertz (kHz)) are provided through band splitter 20 to subscriber line 12 and through band splitter 18 to telephone switch network 28. Band splitter 18 prevents the lower frequency POTS signals from reaching ADSL modem 16. Similarly, band splitter 20 prevents any of the POTS signals from reaching modem 14.

ADSL modem 16 and ADSL modem 14 communicate higher frequency ADSL signals across subscriber line 12. The higher frequency ADSL signals are prevented from reaching telephone 26 and telephone switch network 28 by band splitters 20 and 18, respectively. Splitters 18 and 20 can be passive analog filters or other devices which separate lower frequency POTS signals (below 4 kHz) from higher frequency ADSL signals (above 50 kHz).

The separation of the POTS signals and ADSL signals by splitters 18 and 20 is necessary to preserve POTS voice and data traffic and ADSL data traffic. More particularly, splitters 18 and 20 can eliminate various effects associated with POTS equipment which may affect the transmission of ADSL signals on subscriber line 12. For example, the impedance of subscriber line 12 can vary greatly as at least one telephone 26 is placed on-hook or off-hook. Additionally, the changes in impedance of subscriber line 12 can change the ADSL channel characteristics associated with subscriber line 12. These changes in characteristics can be particularly destructive at the higher frequencies associated with ADSL signals (e.g., from 30 kHz to 1 megahertz (MHz) or more).

Additionally, splitters 18 and 20 isolate subscriber line wiring within residence 22. The impedance of such wiring is difficult to predict. Further still, the POTS equipment, such as, telephone 26, provides a source of noise and nonlinear distortion Noise can be caused by POTS voice traffic (e.g., shouting, loud laughter, etc.) and by POTS protocol, such as, the ringing signal. The nonlinear distortion is due to the nonlinear devices included in conventional telephones. For example, transistor and diode circuits in telephone 26 can add nonlinear distortion and cause hard clipping of ADSL signals. Telephone 26 can further generate harmonics which can reach the frequency ranges associated with the ADSL signals. The nonlinear components can also demodulate ADSL signals to cause a hiss in the audio range which affects the POTS.

Conventional ADSL technology has several significant drawbacks. First, the costs associated with ADSL services can be quite large. Telephone companies incur costs related to central office equipment (ADSL modems and ADSL network equipment) and installation costs associated with the ADSL modems and network equipment. Residential users incur subscriber equipment costs (ADSL modems) and installation costs.

Installation costs are particularly expensive for the residential user because trained service personnel must travel to residence 22 to install band splitter 20 (FIG. 1). Although band splitter 18 must be installed at the central office, this cost is somewhat less because service personnel can install band splitter 18 within central office 32. Also, at office 32, splitter 18 can be included in ADSL modem 16. However, in residence 22, splitter 20 must be provided at the end of subscriber line 12.

Additionally, ADSL equipment for the residence, such as, modem 14, is expensive because the most complex component of modem 14 (e.g., the receiver) is located at residence 22 since high-speed transmissions are generally received within residence 22, and lower-speed transmissions are received by central office 32. In most internet applications, larger amounts of data are requested by the residential user rather than by the internet source. Receivers are typically much more complex than transmitters. These high-speed receivers often receive data at rates of over 6 Mbps.

ADSL equipment can be subject to cross-talk noise from other subscriber lines situated adjacent to subscriber line 12. For example, subscriber lines are often provided in a closely contained bundle. The close containment can cause cross-talk from other subscriber lines to be placed on subscriber line 12. Modem 14 must compensate for cross-talk noise.

Thus, there is a need for a digital subscriber line (DSL) communication system which does not require the use of a splitter in the residence. Further, there is a need for a communication system which allows a DSL modem to be connected directly to the subscriber line similar to the use of a conventional analog modem. Even further, there is a need for a less expensive DSL modem which does not utilize a considerably expensive high-speed receiver which operates at data rates over 2 Mbps. Further still, there is a need for a DSL modem which is not susceptible to errors due to POTS activity on the subscriber line.

SUMMARY OF THE INVENTION

The present invention relates generally to a digital subscriber line modem adapted to be coupled directly to a subscriber line. The modem is capable of simultaneous access to the subscriber line with other telephone equipment operating in a frequency band below 4,000 kilohertz. The modem includes a data terminal for coupling to the subscriber line and a control circuit coupled to the data terminal. The control circuit receives and transmits signals to and from the data terminal. The control circuit utilizes digital signal processing techniques to adapt to varying subscriber line characteristics. The digital signal processing techniques allow the data terminal to be coupled directly to the subscriber line without the use of a splitter.

The present invention further relates to a digital subscriber line modem adapted to be coupled directly to a subscriber line. The modem is capable of simultaneous access to the subscriber line with other telephone equipment operating in a frequency band below 4 kilohertz. The modem includes a data terminal or subscriber line access adapted to be coupled to the subscriber line and a control means for receiving and transmitting signals to and from the data terminal. The control means includes an equalizer means for filtering the signals to accommodate characteristics of the subscriber line, an error processing means for providing a rapid retrain signal in response to an error condition, and a rapid retrain means for rapidly converging the equalizer means in response to the rapid retrain signal. The control means allows the data terminal to be coupled directly to the subscriber line without the use of a splitter.

The present invention even further relates to a communication system for use with a subscriber line. The communication system includes a user digital subscriber line modem located at a user site, a splitter located remotely from the user site, and an office digital subscriber line modem. The user digital subscriber line modem is coupled directly to the subscriber line and receives downstream signals from the subscriber line and transmits upstream signals to the subscriber line. The user digital subscriber line modem utilizes digital signal processing techniques to adapt to varying subscriber line characteristics. The digital signal processing techniques allow the data terminal to be coupled directly to the subscriber line without the use of a splitter between the subscriber line and the user digital subscriber line modem. The splitter has a signal terminal, a lower-frequency path terminal, and a higher-frequency path terminal. The signal terminal is coupled to the subscriber line. The lower-frequency path terminal is coupled to a switched telephone network. The office digital subscriber line modem is coupled to the higher-frequency path terminal. The office digital subscriber line modem transmits the downstream signals to the subscriber line through the splitter and receives the upstream signals from the subscriber line through the splitter.

The present invention still further relates to a customer asymmetric digital subscriber line modem for use in a communication system, including a subscriber line coupled between an office site and a user site. The communication system includes a splitter located remotely from the user site. The splitter has a signal terminal, a lower-frequency path terminal, and a higher-frequency path terminal. The signal terminal is coupled to the subscriber line. The lower-frequency path terminal is coupled to a telephone switch network. The communication system also includes an office asymmetric digital subscriber line modem coupled to the higher-frequency path terminal. The office digital subscriber line modem transmits downstream signals to the subscriber line through the splitter and receives upstream signals from the subscriber line through the splitter. The customer asymmetric digital subscriber line modem includes a data terminal for coupling directly to the subscriber line and a control circuit. The control circuit is coupled to the data terminal. The control circuit receives the downstream signals in a first frequency range and transmits the upstream signals in a second frequency range. The control circuit utilizes digital signal processing techniques to adapt to varying subscriber line characteristics. The digital signal processing techniques allow the data terminal to be coupled directly to the subscriber line without the use of a splitter at the user site.

According to an exemplary aspect of the present invention, the communication system allows POTS signals and ADSL signals to be simultaneously transmitted on a subscriber line without the use of a splitter located in the user's residence. Digital signal processing techniques are utilized to adapt to the varying subscriber line characteristics due to the activity of POTS equipment coupled to the subscriber line. The digital signal processing techniques eliminate the need for the splitter by changing data transmission characteristics in accordance with the varying line characteristics.

According to another exemplary aspect of the present invention, the DSL modem utilizes quadrature amplitude modulated (QAM) signals provided over the subscriber line. The DSL modem transmits DSL signals in a first frequency range and receives DSL signals in a second frequency range in accordance with frequency division multiplexing techniques. The QAM signals are communicated in various constellation sizes from 4 to 256 points.

In accordance with yet another exemplary aspect of the present invention, the DSL modem includes a rapid retrain circuit. The rapid retrain circuit rapidly retrains the modem-to-subscriber line characteristics in as little time as less than 500 milliseconds. Additionally, an automatic gain control (AGC) circuit, which can be adjusted very rapidly, can also be provided. The rapid retrain circuit preferably eliminates steps related to initially converging the equalizer to reduce retrain times. For example, the rapid retrain circuit may only adjust the AGC and converge the equalizer, starting at predicted coefficients. Echo canceling is advantageously not needed because the modem transmits and receives in different frequency rates in accordance with frequency division multiplexing techniques.

In accordance with still another exemplary aspect of the present invention, the ADSL modem adjusts transmission rates in accordance with errors received on the digital subscriber line. The ADSL operates in accordance with a state diagram, wherein the data rate is decreased in response to error signals and increased when a mean square error is below a threshold. The ADSL modem consistently monitors error signals to transmit and to receive at an optimal data rate.

BRIEF DESCRIPTION OF THE DRAWINGS

The invention will be further described with reference to the accompanying drawings, wherein like numerals denote like elements, and.

DETAILED DESCRIPTION OF PREFERRED EXEMPLARY EMBODIMENTS

Figure 2:
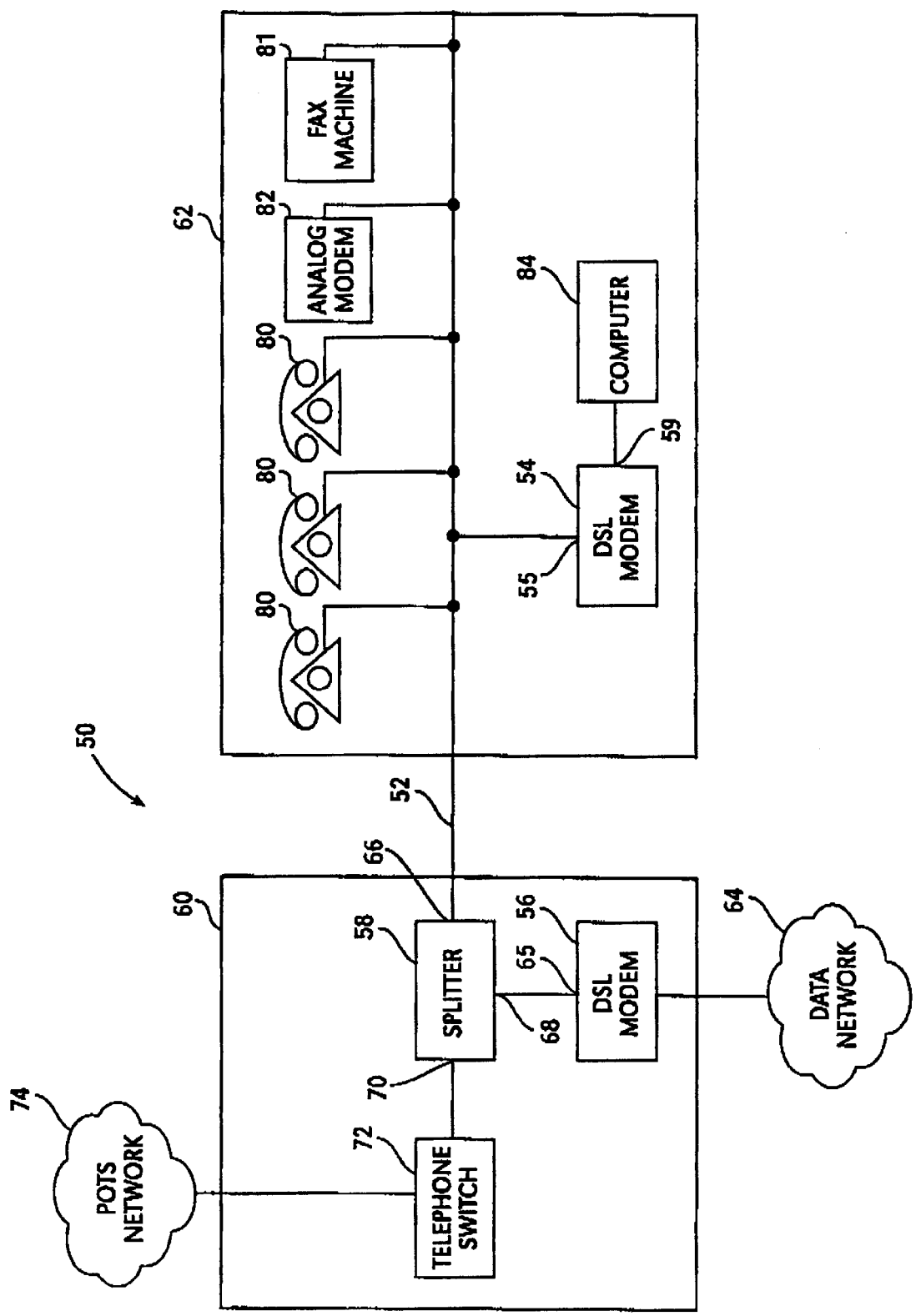
FIG. 2 is a schematic block diagram of a communication system in accordance with an exemplary embodiment of the present invention, the communication system includes a DSL modem in accordance with another exemplary embodiment of the present invention.

With reference to FIG. 2, a DSL communication system 50 includes a copper twisted pair subscriber line 52, a customer or residential DSL modem 54, a central office DSL modem 56, and a band splitter 58. Subscriber line 52 is a local loop, such as, a twisted pair of American wire gauge (AWG) 24 or 26 copper wires, which connects a central office 60 and a residence 62. Residence 62 can also be an office, building, or other facility. Similarly, central office 60 can be any facility associated with a provider of telephone services.

DSL modem 56 is coupled to a data network 64. Splitter 58 has a signal input 66 coupled to subscriber line 52, a higher-frequency output 68 coupled to DSL modem 56, and a lower-frequency output 70 coupled to a telephone switch 72. Telephone switch 72 is coupled to a POTS network 74. DSL modem 56, splitter 58, and telephone switch 72 are preferably located in central office 60. Alternatively, splitter 58 could be included as part of DSL modem 56 (e.g., DSL modem 56 is provided as an in-line device between subscriber line 52 and switch 72).

In residence 62, one or more telephones 80, analog facsimile machine 81, and analog modem 82 can be coupled directly to subscriber line 52 as is well known in the art. Telephones 80 can be any conventional communication devices, including answering machines, which can be coupled to subscriber line 52 for providing various POTS functions.

DSL modem 54 is coupled directly to subscriber line 52 at a data terminal, input/output or subscriber line access 55. DSL modem 54 is also coupled to a computer 84. Alternatively, DSL modem 54 could be coupled to other devices (not shown), such as, a network, server, or other communication or computing device.

Figure 1:
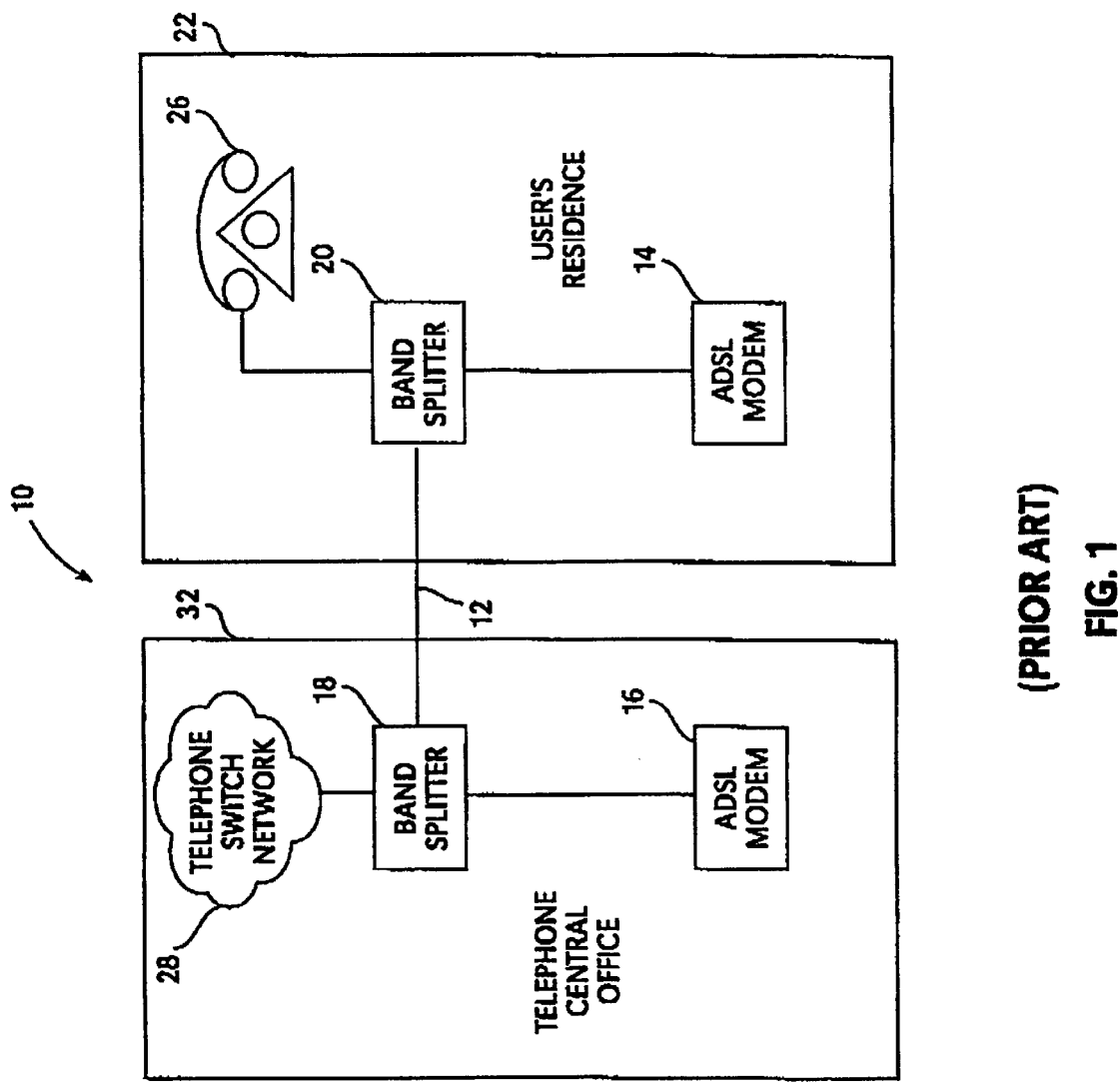
FIG. 1 is a schematic block diagram of a prior art ADSL communication system.

Unlike conventional ADSL or DSL communication systems, such as, system 10 described with reference to FIG. 1, DSL modem 54 does not utilize a splitter between modem 54 and subscriber line 52 and between telephones 80 and subscriber line 52. DSL modem 54 advantageously utilizes digital signal processing techniques to adapt to varying subscriber line characteristics due to analog equipment, such as, telephones 80, machine 81, and modem 82, thereby eliminating the need for a splitter in residence 62. DSL modem 54 can operate concurrently with any of telephones 80, machine 81, and analog modem 82.

DSL modem 54 preferably includes subscriber line access 55 which is part of a standard connector, such as, an RJ11 walljack, and is coupled to subscriber line 52 similarly to conventional telephones 80 and analog modems 82. Access 55 is preferably a two-wire terminal.

Figure 3:
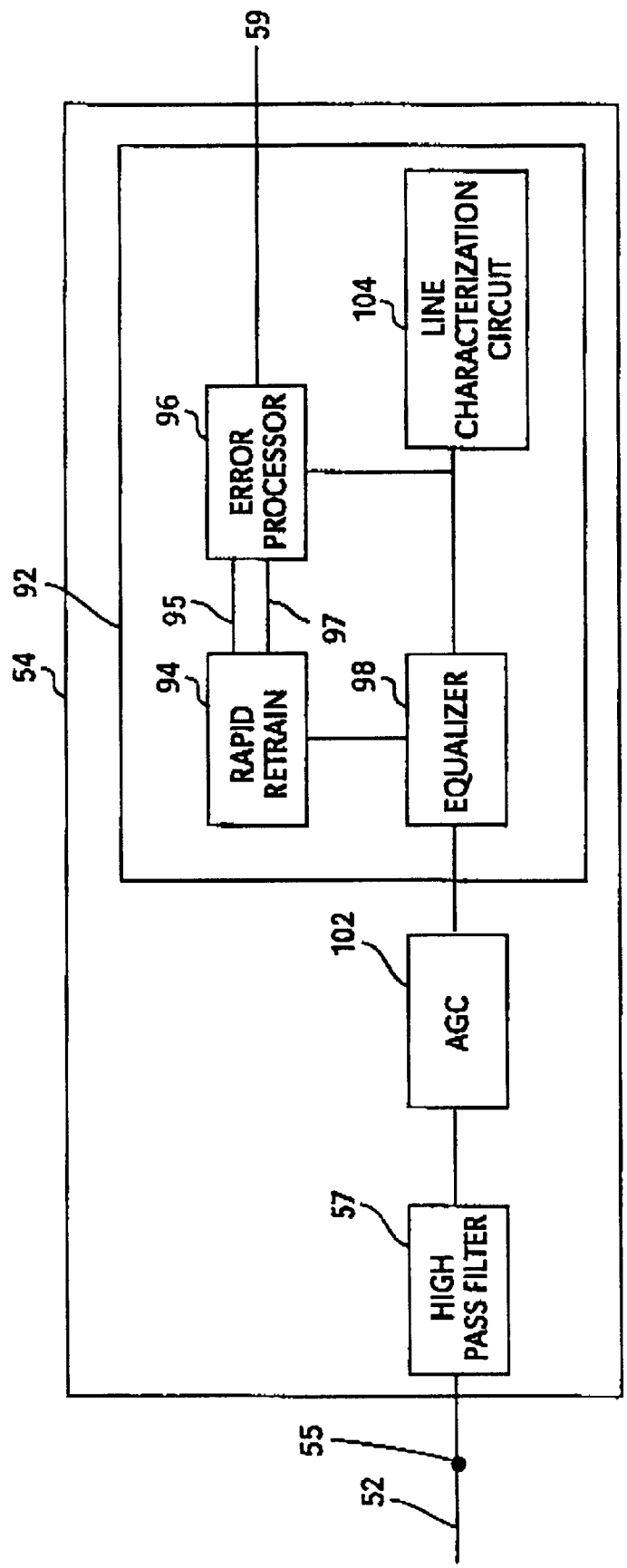
FIG. 3 is a more detailed schematic block diagram of the DSL modem illustrated in FIG. 2, the DSL modem includes a control circuit in accordance with yet another exemplary embodiment of the present invention.

Modem 54 can be provided as an internal device in computer 84, such as, on a PCI card, or as an external device. Preferably, modem 54 is an internal device so that high speed communications between modem 54 and computer 84 are not slowed by serial ports associated with computer 84. As an external device, modem 54 could be coupled through a printer port or a universal serial bus (USB) to computer 84. In FIG. 3, modem 54 is coupled to computer 84 via a data terminal 59.

Modem 54 is preferably implemented with a digital signal processing chip set. Other suitable processors can be utilized to run software modules to implement the operations described in the present application. The software modules implement most tasks associated with modem 54. The tasks include digital filtering, line characterization, modulation, demodulation, gain control, equalization, initialization error correction, test functions, and other modem requirements.

In operation, modem 54 adjusts operating characteristics, such as, equalization parameters, gain, and data rates, according to variables associated with line 52. Modem 54 is capable of receiving data at least at a one megabit per second (Mbps) data rate when line 52 is approximately 12 kilofeet and when all of telephones 80 are on-hook. Preferably, the reception (downstream) data rate is no worse than 256 Kbps data rate in the presence of POTS-related impairments associated with telephones 80. Modem 54 is capable of transmitting data at least at a 100 Kbps data rate when line 52 has a length of 12 kilofeet and when all telephones 80 are on-hook. The transmission (upstream) data rate is preferably no worse than 64 Kbps in the presence of POTS-related impairments. By utilizing lower data rates than maximum ADSL data rates, such as, 6 Mbps, modem 54 can be manufactured less expensively and is more able to withstand POTS-related impairments.

DSL modem 56 is similar to DSL modem 54. However, modem 56 preferably is a lower-power modem to minimize the power consumed by central office 60. Additionally, modem 56 can have a sleep mode so that when modem 56 is not being accessed, significant power is not consumed by modem 56. Modem 56 can have a lower-cost receiver unit (not shown) because upstream data rates are lower than downstream data rates, as discussed above. In the sleep mode, processors and other electronic devices in modem 56 are placed in a low-power or no-power mode by slowing or stopping clock signals within modem 56. If modem 54 is utilized within a laptop computer, lower-power techniques are desirable for modem 54 as well.

Modem 54 advantageously utilizes digital signal processing techniques to characterize and to classify interference sources going both to the POTS portion of the spectrum from the DSL portion of the spectrum and from the POTS portion of the spectrum to the DSL portion of the spectrum. Modem 54 compensates for these interference sources with digital signal processing techniques. For example, when telephone 80 is brought off-hook, an impedance change occurs on line 52. Modem 54 can adjust data rates, gain characteristics, and filter parameters to compensate for the impedance change. Thus, modem 54 can utilize digital signal processing techniques to compensate for interference from POTS equipment, such as, telephone 80. Preferably, the digital signal processing techniques can rapidly adjust to interference sources so communication latency are not noticeable to the user.

In operation, DSL modems 54 and 56 communicate signals as quadrature amplitude modulated (QAM) signals. DSL modems 54 and 56 communicate data at various constellation sizes, ranging from 4 to 256 UC points. The data is transmitted in Reed-Solomon frames, where the R-S code rate is 0.941176471 (K/N) and N=68 and K=64. Alternatively, other values for N and K can be utilized to optimize data and frame rates.

DSL modem 54 transmits upstream signals in a lower-frequency range and receives downstream signals in a higher-frequency range, in accordance with frequency division multiplexing techniques. For example, modem 54 preferably transmits upstream signals at a carrier frequency between a lower band edge of 46 kHz and an upper band edge of 114 kHz. Modem 54 transmits upstream signals at a line rate (e.g., bandwidth or data rate) of 136 Kbps for a constellation size of 4 points and at a data rate of 340 Kbps for a constellation size of 32 points. Modem 56 receives the upstream signals at the same rates.

DSL modem 56 transmits downstream signals at a carrier frequency between a lower band edge of 265.5 kHz and an upper band edge of 605.5 kHz. DSL modem 56 transmits downstream signals at data rate of 680 Kbps for a constellation size of 4 points and at a data rate of 1.7 Mbps for a constellation rate of 32 points. Modem 54 receives the downstream signals at the same rates. A variety of carrier frequencies can be utilized, such as, 342 kHz, 367.5 kHz, or 418.5 kHz for transmitting downstream information. The use of frequency division multiplexing eliminates the need for an echo canceler (not shown) and eliminates nonlinear effects of echo canceling.

Modems 54 and 56 can utilize a variety of protocols to transmit and receive upstream and downstream signals. Modems 54 and 56 could additionally utilize a auxiliary channel within a control frequency band for transmitting control information between modems 54 and 56. Modems 54 and 56 can also utilize various error protocol, such as, Read-Solomon coding, multidimensional trellis coding, or other protocols, to gain higher immunity to noise and other phone line impairments. Trellis coding is a method of forward error correction where each signal element is assigned a coded binary value representing the element's phase and amplitude. The coding allows the receiving modem to determine, based on the value of the receiving signal, whether or not a given signal element is received in error.

With reference to FIG. 3, modem 54 includes a high-pass filter 57 coupled between access 55 which is coupled to subscriber line 52 and a control circuit 92. High-pass filter 57 preferably has a threshold frequency above 4 kHz and beneath the lowest band carrier edge for the DSL signals (e.g., 46 kHz) to prevent POTS signal from entering modem 54. Control circuit 92 includes a rapid retrain module or circuit 94, an error processor 96, a line characterization module or circuit 104, and an equalizer 98. Additionally, an automatic gain control circuit (AGC) 102 is disposed between high-pass filter 57 and equalizer 98.

Circuit 102 can be an analog circuit. Alternatively, circuit 102 can be a digital circuit located in control circuit 92 or a hybrid analog and digital circuit. Filter 57 can be a passive filter with a threshold frequency of 10 kHz. Equalizer 98 is a digital filter through which signals are transmitted and received to and from line 52. Equalizer 98 can be on a receive side of control circuit 92, a transmit side of control circuit 92, or both. Equalizer 98 is an adaptive compensation circuit for counteracting distortions on line 52.

Equalizer 98 is preferably a decision feedback equalizer defined by tap coefficients. Equalizer 98 is implemented by a digital signal processor (not shown) running a software program. In the receive mode, equalizer 98 provides filtered signals to error processor 96 as well as other portions of control circuit 92. The filtered signals are processed by circuit 92 and provided at data terminal 59. In the transmit mode, other filters or equalizers can filter or pre-emphasize signals provided by modem 54 to line 52.

Equalizer 98 must be converged (e.g., tuned) so the constellation associated with QAM signals are appropriately situated for decoding. Alternatively, equalizer 98 can be any device, digital or analog, for reducing frequency or phase distortion, or both, on subscriber line 52 by the introduction of filtering to compensate for the difference in attenuation or time delay, or both, at various frequencies in the transmission and reception spectrums.

Rapid retrain circuit 94 provides control signals (e.g., tap coefficients) to equalizer 98 to converge equalizer 98, thereby compensating for distortion on line 52. Rapid retrain circuit 94 causes equalizer 98 to converge in response to a raise rate rapid retrain signal provided by error processor 96 on a line 97. Rapid retrain circuit 94 also causes equalizer 98 to converge in response to a lower rate rapid retrain signal provided by error processor on a line 95. Rapid retrain circuit 94 can utilize tap coefficients developed by line characterization circuit 104. As discussed in more detail below, circuit 104 can store a number of coefficients for known error conditions in a flash memory or other storage device. Alternately, the coefficients can be interactively determined, as discussed below.

Error processor 96 monitors signals from equalizer 98 to determine if significant errors in the communication of data on line 52 are occurring. If significant errors are occurring, a lower rate rapid retrain signal is provided on line 95 so rapid retrain circuit 94 retrains modem 54. If few errors are occurring, and data is communicated at a lower data rate, a raise rate retrain signal is provided on line 97 so circuit 94 retrains modem 54 so data is communicated at a higher rate.

As part of the retrain operation, modem 54 performs a variety of tasks to ensure accurate data communication. A retrain operation for modem 54 can include the following tasks: reacquiring timing from a remote modem, such as, modem 56, converging equalizer 98, and adjusting the data rate. Additionally, the retrain operation can also include characterizing line 52 and adjusting the automatic gain control circuit 102. Depending on modem 54 and line 52 parameters, circuit 94 can perform different levels of retrain operations.

In a slow retrain or initialization operation, a retrain operation from initiation variables (e.g., scratch) of modem 54 can include reacquiring timing, characterizing line 52, adjusting circuit 102 from initialization variables, converging equalizer 98 from initialization variables, and determining a data rate. Characterizing line 52 can involve performing line characterization routines by circuit 104, as discussed below. Since adjustments to circuit 102 and converging equalizer 98 is an interactive process, these procedures can be time-consuming. The slow retrain can take as long 6.5 seconds. Nonetheless, time is saved, even in the slow retrain operation when compared to conventional modems, because modem 54 advantageously does not utilize an echo canceler (not shown). The echo canceler typically must be reset during a retrain operation.

To save time, a rapid-retrain operation can eliminate one or more of the above steps or perform the above steps from predicted variables (variables which are initially closer to the desired value than initialization variables). In a rapid retrain operation, the line characterization step is eliminated, and circuit 102 and 98 are adjusted slightly or converged from a stored coefficient. For example, according to a rapid retrain operation, the center tap coefficient for equalizer 98 can be determined, and the remaining coefficients can be adjusted based on the difference between the determined center tap coefficient and the previous center tap coefficient.

According to another rapid retrain operation, prestored tap coefficients are utilized so equalizer 98 does not have to be significantly converged. The tap coefficients are chosen based upon conditions recognized by circuit 94, such as, telephone 80 (FIG. 2) being brought off-hook. The adjustment of the gain circuit 102 can be restricted to a range to save time.

System and application parameters associated with modem 54 and line 52 can define the amount of time required for a rapid retrain of modem 54. For example, a rapid retrain may occur in a particular amount of real time, such as, less than 0.5 seconds. A rapid retrain within 0.5 seconds assures that the transmission of data is not affected for perceivable delays as modem 54 is retrained. A 0.5 second retrain operation is a vast improvement over the conventional 6.5 seconds for initialization retrain operations. Alternatively, the rapid retrain operation may occur in a much shorter time period, particularly if error processor 96 and rapid retrain circuit 94 are able to determine what changes on subscriber line 52 have caused errors. Circuit 94 can react to those changes and access a database or other data indicative of coefficients for equalizer 98, gain parameters for circuit 102, data rates, or other criteria for appropriate communication of data on line 52. For example, such a database could be stored on computer 84 coupled to modem 54 (FIG. 2). Further still, a very rapid retrain operation could occur where equalizer 98 does not have to be converged, and only the gain of circuit 102 needs to be adjusted. Thus, rapid retrain circuit 94 is capable of retraining modem 54 in a rapid manner in response to error processor 96 discovering that there are errors in the communication of data on subscriber line 52.

When rapid retrain circuit 94 performs a retrain operation, data rates associated with modem 54 are adjusted to maximize the data rate, while maintaining the integrity of the communications. For instance, if error processor 96 determines that a particular number of errors are occurring, rapid retrain circuit 94 may adjust the data rate down by reducing the size of the constellation or reducing the symbol rate. Error processor 96 can determine errors which require an adjustment of equalizer 98, such as, tangential error, radial error, or other errors. Error processor 96 can also react to trellis-coding errors, Reed-Solomon errors, mean squared error levels, or other errors. Alternatively, if error processor 96 determines that the mean squared error level is below a threshold, rapid retrain circuit 94 can retrain modem 54 and adjust the data rate upward by increasing the size of the constellation or increasing the symbol rate. The threshold used to compare the mean squared error, as well as other errors, is variable according to user parameters and the data rate.

Line characterization circuit 104 can perform a variety of operations to characterize line 52 for the development of tap coefficients for equalizer 98 and of other parameters for modem 54. Line characterization tests can be performed when modem 54 is at initialization, in an idle mode, or in a non-idle mode. According to one line characterization test, tones or test patterns are transmitted across line 52 in accordance with a test protocol. Modems 54 and 56 cooperate to determine characteristics of line 52 based upon received tones or test patterns. In a non-idle mode, the test pattern can be sent and analyzed during the time the user is awaiting communications from the Internet. Further, a separate control channel can be utilized to send control information necessary to characterize line 52.

In another embodiment, circuit 104 can enter a learn mode and analyze line 52 under a variety of conditions. While in the learn mode, the user can bring telephone 80 (FIG. 2) off-hook in response to instructions generated by software on computer 84. Modem 54 can characterize line 52 during those particular conditions. Coefficients for equalizer 98 can be generated for those conditions and stored for a rapid retrain operation. Further still, circuit 104 can perform line-probing operations similar to the V.34 standard.

In yet another embodiment, an echo canceler (not shown) can be utilized on a transmit side of modem 54 to remove the transmitted signals in the transmit frequency spectrum. Control circuit 92 can analyze the characteristics in the transmit frequency spectrum of line 52. This analysis can be performed during non-idle modes. The portion of equalizer 98 on the transmit side can be adjusted according to the analysis to predistort or to preemphasize the transmitted signals. Digital frequency processing techniques can also include various error signal analysis, correction, and manipulation to determine when a rapid retrain is necessary as-well as techniques for rapidly converging an equalizer associated with modem 54.

Figure 4:
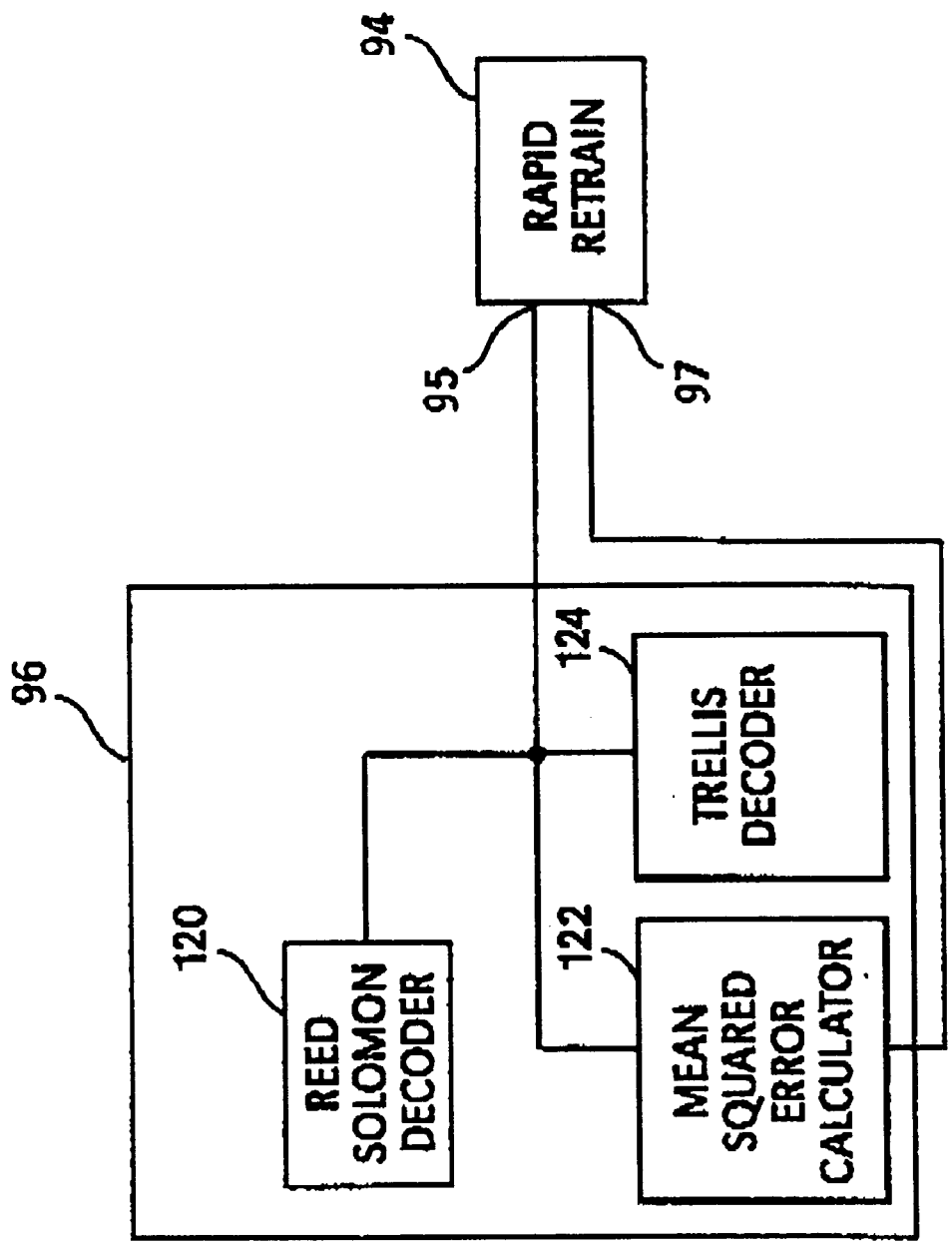
FIG. 4 is a more detailed schematic block diagram of the control circuit illustrated in FIG. 3.

With reference to FIG. 4, error processor 96 includes a Reed-Solomon decoder 120, a mean-squared error calculator 122, and a Trellis decoder 124. Reed-Solomon decoder 120 analyzes frames of data provided from error decoder 124 and determines if a frame error occurs and if errors are occurring in the frame. Reed-Solomon decoder 120 can correct errors as is well known in the art. Alternatively, calculator 122 can be replaced by other systems which can provide an indication of signal-to-noise ratios.

Reed-Solomon decoder 120, calculator 122, and Trellis decoder 124 provide a lower rapid retrain signal when error conditions indicate that the data rate should be lowered. Rapid retrain circuit 94 performs a rapid retrain operation and lowers the data rate in response to the lower rate rapid retrain signal at input 95. In contrast, when the mean squared error calculator 122 provides a raise rate rapid retrain signal at input 97, rapid retrain circuit 94 raises the data rate and performs a rapid retrain. Thus, modem 54 automatically raises or lowers its data rate to maintain high-speed and accurate communications in the presence of POTS-related impairments.

Although the data rates associated with modems 54 and 56 are somewhat lower than maximum data rates associated with conventional ADSL systems, these data rates are still significantly larger than conventional analog modem capabilities. The lower data rates allow modems 54 and 56 to use smaller constellation sizes and frequency division multiplexing, as well as withstand POTS-related impairments.

Digital signal processing techniques can include rapid retrain operations where the modem is adjusted to changing subscriber line techniques due to POTS operations. Such adjustments can include adjusting automatic gain control circuit 102, converging equalizer 98, and error processing. Further, digital signal processing techniques can include line characterization techniques performed by circuit 104 (FIG. 3).

Figure 5:
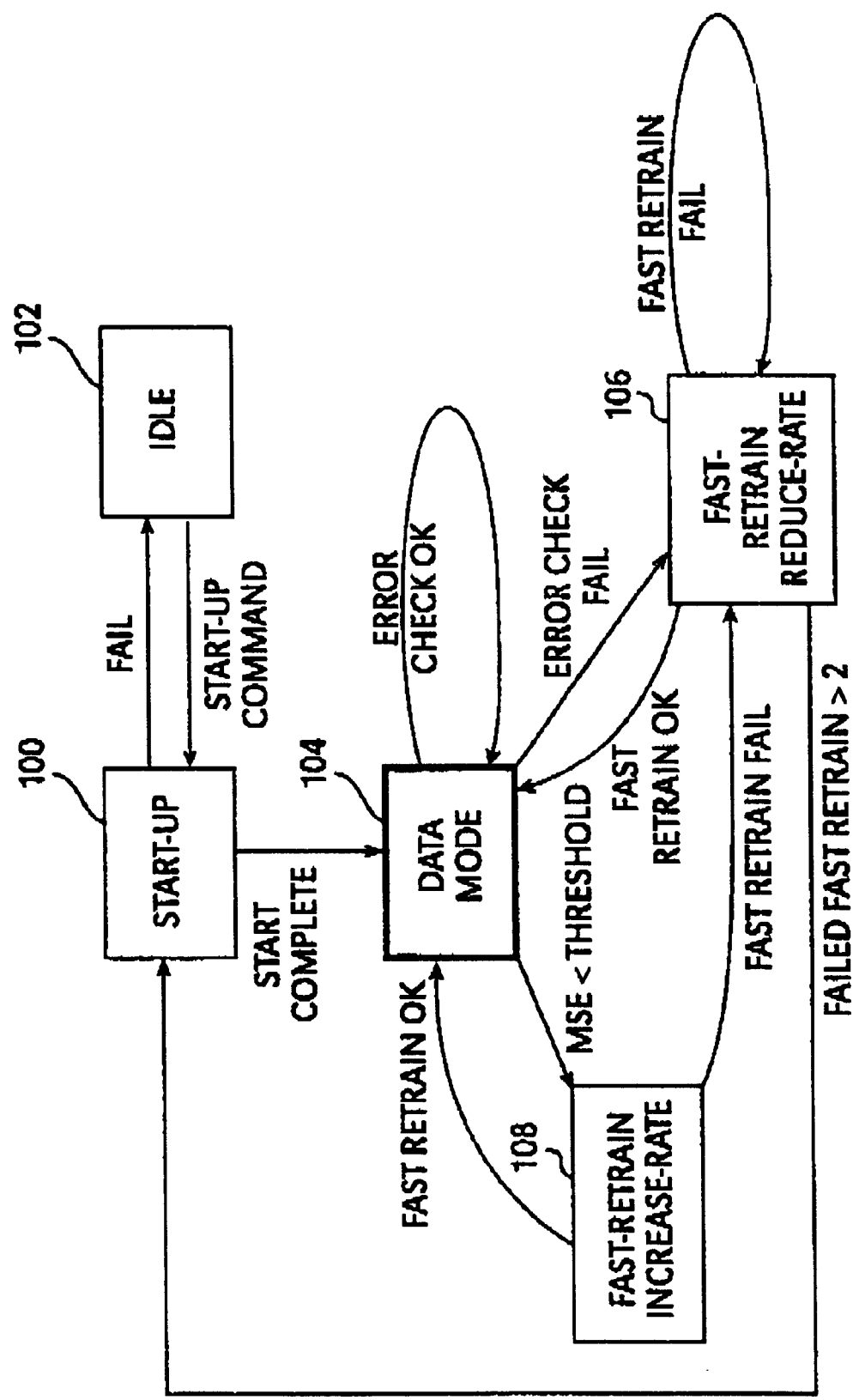
FIG. 5 is a state diagram showing an example of the operation of the DSL modem illustrated in FIG. 3.

With reference to FIG. 5, operation of modem 54 is described with reference to FIGS. 2–5. FIG. 5 is a state diagram showing rapid retrain operations for modem 54. Modem 54 preferably always provides the highest data rate available on line 52, according to a rate-adaptive digital subscriber line technique. Modem 56 should have the ability to set a maximum downstream data rate so that the telephone company can limit the maximum downstream data rate to avoid advantaging subscribers who live close to office 60. According to this technique, modems 54 and 56 constantly adjust the data rates to reach maximum data rate potential on subscriber line 52 (FIG. 2).

In FIG. 5, modem 54 (FIG. 2) is capable of a start-up state 100, an idle state 102, a data mode state 104, a fast retrain reduce rate state 106, and a fast retrain increase rate state 108. When off or idle, modem 54 transfers from idle state 102 to start-up state 100 when it receives a start-up command.

In start-up state 100, modem 54 is initialized. During initialization, timing is acquired from a remote modem, such as, modem 56, automatic gain circuit 102 is adjusted, equalizer 98 is converged, the carrier phase is locked, line 52 is characterized, and a data rate is selected. If start-up is successfully completed, modem 54 advances to data mode state 104, where data is communicated across subscriber line 52.

As data is communicated at the data rate selected during start-up state 100, error signals from error processor 92 are consistently checked. If the error signals are within an acceptable level, modem 54 is maintained in data mode state 104. However, if the error signals are above a particular level, modem 54 enters fast retrain reduce rate state 106. In state 106, modem 54 reduces the data rate, adjusts automatic control circuit 102, re-acquires timing, and converges equalizer 98. Preferably, equalizer 98 is retrained from stored coefficient values to reduce the amount of time required for retraining. Alternatively, another mode (not shown) may be entered where just the automatic gain control 102 (FIG. 3) is adjusted, and the data rate is not changed to compensate for errors.

In state 106, if the fast retrain fails, another fast retrain is attempted. If more than two fast retrain attempts fail, modem 54 returns to start-up state 104. As at initialization, if start-up fails, modem 54 enters idle state 102.

If the fast retrain operation is successfully completed, modem 54 returns to data mode state 104 and continues to communicate data at a lower data rate. The data rate can be adjusted incrementally or by other relationships. For example, if the errors are due to known POTS activity, particular data rates may be known to operate during that activity, and those data rates may be chosen.

In state 104, if the mean square error signal provided by mean square error calculator 122 is below a threshold, modem 54 enters fast retrain increase rate state 108. Modem 54 is retrained in state 108 similarly to state 106, except that the data rate is increased. If the fast-retrain operation is completed successfully, modem 54 changes from state 108 to state 104 and continues normal data communication operations at the faster rate. If the fast retrain operation fails in state 108, modem 54 enters state 106 and performs a fast retrain reduce rate operation.

It is understood that, while the detailed drawings and specific examples given describe preferred exemplary embodiments of the present invention, they are for the purpose of illustration only. The apparatus and method of the invention is not limited to the precise details and conditions disclosed. For example, although QAM signals and frequency division multiplexing is utilized, other protocols can be implemented. Also, although parameters related to a rapid retrain operation are discussed, the rapid retrain operation may include a variety of steps for ensuring the integrity of the data channel at high data rates. Various changes may be made to the details disclosed without departing from the spirit of the invention which is defined by the following claims.

What is claimed is:

1. A digital subscriber line modem adapted to be coupled directly to a subscriber line, the modem being capable of simultaneous access to the subscriber line with other telephone equipment operating in a frequency below four kilohertz, the modem comprising:

a data terminal for coupling to the subscriber line;

a control circuit coupled to the data terminal, the control circuit receiving and transmitting signals to and from the data terminal, the control circuit adjusts operating characteristics for transmitting and receiving the signals to reduce interference with the signals which allows the data terminal to be coupled directly to the subscriber line without the use of a splitter.

2. The digital subscriber line modem of claim 1, further comprising:
a high pass filter coupled between the data terminal and the control circuit, the high pass filter attenuating lower frequency signals from the data terminal.

3. The digital subscriber line modem of claim 2, wherein the high pass filter attenuates the lower frequency signals having a frequency below 46 kHz.

4. The digital subscriber line modem of claim 1, wherein the subscriber line is a twisted pair copper line.

5. The digital subscriber line modem of claim 1, wherein the control circuit transmits and receives the data in a data mode, the control circuit transmitting and receiving the data at data rates, the control circuit adjusting the data rates in response to varying conditions due to the other telephone equipment on the subscriber line.

6. The digital subscriber line modem of claim 5, wherein the varying conditions include changes in the impedance of the subscriber line due to hooking or unhooking the other telephone equipment.

7. The digital subscriber line modem of claim 1, wherein the control circuit further includes a rapid retrain circuit and an error processing circuit, the error processing circuit providing a lower rate retrain signal when the error processing circuit detects a predetermined number of errors associated with the data, wherein the rapid retrain circuit lower data rates of the modem in response to the lower rate retrain signal.

8. The digital subscriber line modem of claim 1, wherein the control circuit further includes a rapid retrain circuit and am error processing unit, the error processing circuit providing a raise rate retrain signal when an error signal is below a threshold, wherein the rapid retrain circuit raises the data rates of the modem in response to the raise rate retrain signal.

9. The digital subscriber line modem of claim 8, wherein the threshold varies with the data rates, and the error signal is a mean squared error signal.

10. The digital subscriber line modem of claim 7, wherein the rapid retrain circuit rapidly retrains the modem in response to the lower rate retrain signal.

11. The digital subscriber line modem of claim 10, wherein rapid retraining includes reacquiring timing from a remote unit providing the data on the subscriber line, and converging an equalizer.

12. The digital subscriber line modem of claim 11, wherein the rapidly retraining occurs within 500 milliseconds.

13. The digital subscriber line modem of claim 7, wherein the signals are quadrature amplitude modulated signals and are frequency division multiplexed for transmit signals and receive signals.

14. A digital subscriber line modem adapted to be coupled directly to a subscriber line, the modem being capable of simultaneous access to the subscriber line with other telephone equipment operating in a frequency band below the four kilohertz band, the modem comprising:
a data terminal adapted to be coupled to the subscriber line; and
a control means for receiving and transmitting signals to and from the data terminal, the control means including an equalizer means for filtering the signals to accommodate characteristics of the subscriber line, an error-processing means for detecting an error condition and providing a rapid retrain signal in response to a detection of said error condition, and a rapid retrain means for rapidly converging the equalizer means in response to the rapid retrain signal, whereby the control means allows the data terminal to the subscriber line without the use of a splitter.

15. The digital subscriber line modem of claim 14, wherein the equalizer means filters according to coefficients, and the rapid retrain means provides initial coefficients in accordance with a line condition related to the error condition.

16. The digital subscriber line modem of claim 15, wherein the control means further includes a database for storing the initial coefficients for various line conditions, the rapid retrain means selecting the initial coefficients for a particular line condition in response to the error signal.

17. The digital subscriber line modem of claim 14, wherein the error processing means monitors a noise level at an output of the equalizer means.

18. The digital subscriber line modem of claim 14, wherein the error processing means receives a Reed-Solomon error signal or a Viterbi error signal.

19. The digital subscriber line modem of claim 14, wherein the rapid retrain means lowers a data rate of the signals without characterizing the subscriber line.

20. A communication system for use with a subscriber line, the communication system comprising:
a user digital subscriber line modem, located at a user site, the user digital subscriber line modem being coupled directly to the subscriber line and receiving downstream signals from the subscriber line and transmitting upstream signals to the subscriber line and adjusts operating characteristics for transmitting the upstream signals and receiving the downstream signals to reduce interference with the upstream and downstream signals which allows the user digital subscriber line modem to be coupled directly to the subscriber line without the use of a splitter between the subscriber line and the user digital subscriber modem;
a splitter, located remote from the user site, the splitter having a signal terminal, a low frequency path terminal and a higher-frequency path terminal, the signal terminal being coupled to the subscriber line, the lower frequency path terminal being coupled to a switched telephone network; and
an office digital subscriber line modem coupled to the higher frequency path terminal, the office digital subscriber line modem transmitting the downstream signals to the subscriber line through the splitter and receiving the upstream signals from the subscriber line through the splitter.

21. The communication system of claim 20, wherein the adjusting of operating characteristics include rapidly retraining the user digital subscriber line modem in response to varying characteristics of the subscriber line.

22. A customer asymmetric digital subscriber line modem for use in a communication system including a subscriber line coupled between an office site and a user site, the communication system including a splitter located remote from the user site, the splitter having a signal terminal, a lower frequency path terminal, and a higher frequency path terminal, the signal terminal being coupled to the subscriber line, the lower frequency path terminal being coupled to a telephone switch network, the communication system including an office asymmetric digital subscriber line modem to the higher frequency path terminal, the office asymmetric digital subscriber line modem transmitting downstream signals to the subscriber line through the splitter and receiving upstream signals from the subscriber line through the splitter, the customer asymmetric modem comprising:

a data terminal for coupling directly to the subscriber line; and a control circuit coupled to the data terminal, the control circuit receiving the downstream signals in a first frequency range and transmitting the upstream signals in a second frequency range, the control circuit adjusts operating characteristics for transmitting the upstream signals and receiving the downstream signals to reduce interference with the upstream and downstream signals which allows the data terminal to be coupled directly to the subscriber line without the use of a splitter at the user site.

23. The modem of claim 22, wherein the upstream signals and downstream signals are quadrature amplitude modulated signals.

24. The modem of claim 22, further comprising:

a high pass filter coupled between the data terminal and the control circuit, the high pass filter attenuating lower frequency signals at the data terminal.

25. The modem of claim 22, wherein the control circuit adjusts data rates of the upstream and downstream signals in response to varying conditions on the subscriber line.

26. The modem of claim 25, wherein the varying conditions include changes in the impedance of the subscriber line due to hooking or unhooking other telephone equipment coupled to the subscriber line.

27. The modem of claim 22, wherein the control circuit further includes a rapid retrain module and an error processing module, the error processing module providing a lower rate retrain signal when the error processing module detects a predetermined number of errors associated with the upstream and downstream signals, wherein the retrain circuit lowers the data rates of the modem and rapidly retrains the modem in response to the lower rate retrain signal.

28. The modem of claim 27 wherein the error processing module provides a raise rate retrain signal when a mean error signal is below a threshold, wherein the retrain circuit raises the data rates of the modem in response to the raise rate retrain signal.

29. A digital line modem adapted to be coupled directly to a subscriber line, the modem being capable of simultaneous access to the subscriber line with other telephone equipment operating in a frequency band below 4 kHz, the modem comprising:

a data terminal for coupling to the subscriber line; and a control circuit coupled to the data terminal to receive and transmit signals therefrom, the control circuit being configured to adjust operating characteristics for transmitting and receiving the signals to reduce interference with the signals which allows the modem to receive and transmit digital data from the subscriber line without a splitter coupled between the data terminal and the subscriber line.

* * * * *